(12) United States Patent
Meltzer (10) Patent No.: US 7,885,359 B2
(45) Date of Patent: Feb. 8, 2011

(54) SAMPLING DEMODULATOR FOR AMPLITUDE SHIFT KEYING (ASK) RADIO RECEIVER

(75) Inventor: David Meltzer, Wappinger Falls, NY (US)

(73) Assignee: Seiko Epson Corporation, Tokyo (JP)

( * ) Notice: Subject to any disclaimer, the term of this patent is extended or adjusted under 35 U.S.C. 154(b) by 796 days.

(21) Appl. No.: 11/839,347

(22) Filed: Aug. 15, 2007

(65) Prior Publication Data

US 2009/0046809 A1     Feb. 19, 2009

(51) Int. Cl.
*H03D 1/24* (2006.01)
(52) U.S. Cl. .................................................. 375/320
(58) Field of Classification Search ............... 375/259, 375/268, 271, 316, 320, 322, 340; 329/304, 329/310, 347, 372
See application file for complete search history.

(56) References Cited

U.S. PATENT DOCUMENTS

| 4,622,683 | A | 11/1986 | Basham et al. |
| 5,319,191 | A * | 6/1994 | Crimmins ............... 250/214 R |
| 5,532,641 | A | 7/1996 | Balasubramanian et al. |
| 6,255,901 | B1 | 7/2001 | Steinhagen et al. |
| 6,275,544 | B1 * | 8/2001 | Aiello et al. ............... 375/326 |
| 6,496,549 | B1 | 12/2002 | Crawford |
| 6,603,368 | B1 | 8/2003 | Leahy et al. |
| 6,643,471 | B2 * | 11/2003 | Gurusami et al. ............ 398/189 |
| 7,606,297 | B2 * | 10/2009 | Waschura et al. ............ 375/224 |
| 7,706,480 | B2 * | 4/2010 | Stojanovic et al. .......... 375/340 |
| 7,715,501 | B2 * | 5/2010 | Stojanovic et al. .......... 375/340 |
| 2002/0001316 | A1 | 1/2002 | Hornsby et al. |
| 2005/0237966 | A1 * | 10/2005 | Aiello et al. ................. 370/321 |
| 2008/0252367 | A1 * | 10/2008 | Pettersen et al. ............. 329/311 |

FOREIGN PATENT DOCUMENTS

| JP | 08251240 | 9/1996 |
| JP | 2002232495 | 8/2002 |

OTHER PUBLICATIONS

Baru, Marcelo, et al., "An ASK Demodulator in CMOS Technology", 1998.

* cited by examiner

*Primary Examiner*—Jean B Corrielus (57) ABSTRACT

A method, algorithm, circuits, and/or systems for amplitude shift keying (ASK) modulation are disclosed. In one embodiment, a sampling demodulator includes a comparator configured to compare an ASK modulated input to a predetermined voltage level and provide a comparison result, a pulse stretcher with a sampler configured to sample the comparison result a plurality of times for each of a plurality of cycles of the ASK modulated input to generate a bit stream and digital logic configured to determine a value for each data bit in the ASK modulated input from the bit stream, and a digital filter configured to filter an output of the digital logic, thereby providing a demodulated signal.

29 Claims, 8 Drawing Sheets

FIG. 1 (conventional)

FIG. 9 ular ity of cycles of the ASK modulated input to generate a bit stream and digital logic configured to determine a value for each data bit in the ASK modulated input from the bit stream, and a digital filter configured to filter an output of the digital logic, thereby providing a demodulated signal.

SAMPLING DEMODULATOR FOR AMPLITUDE SHIFT KEYING (ASK) RADIO RECEIVER

FIELD OF THE INVENTION

The present invention generally relates to the field of receiver circuits. More specifically, embodiments of the present invention pertain to methods, circuits, and/or systems for demodulators for amplitude modulation (AM) radio receivers using amplitude shift keying (ASK) modulation.

DISCUSSION OF THE BACKGROUND

Amplitude shift keying (ASK) amplitude modulation (AM) is a relatively simple and inexpensive modulation method for sending data via radio. In this approach, a radio frequency (RF) sine wave or "carrier" may be in an on state (e.g., full amplitude), or an off state (e.g., zero or reduced amplitude), depending on whether a respective binary '1' or '0' is to be sent. The duration of each bit may be dependent on a desired transmit spectrum, as well as the robustness of the receiver. However, each bit typically occupies many cycles of the carrier wave. Unfortunately, this conventional approach, while being relatively simple, is also fairly inefficient in terms of both power and radio spectrum usage.

Figure 1:
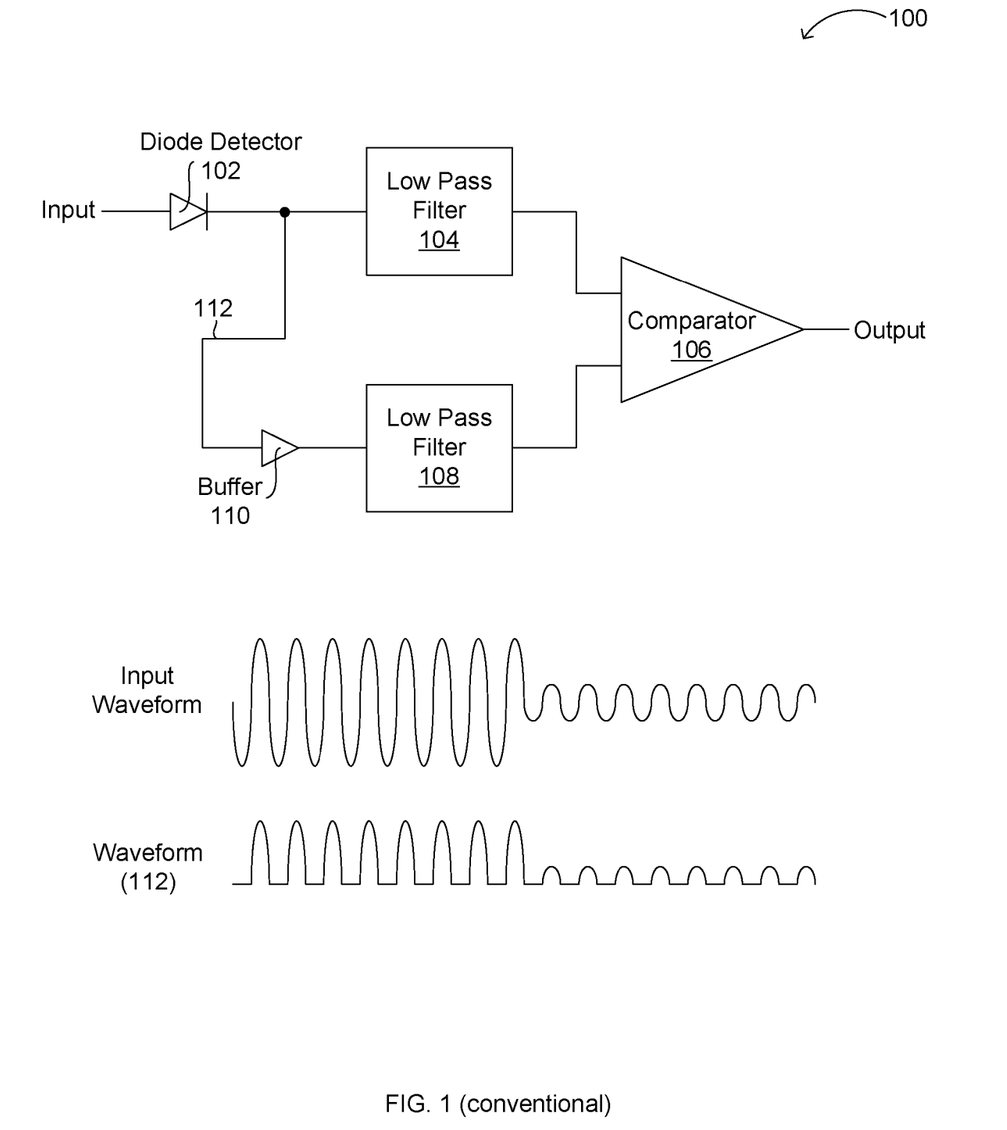
FIG. 1 is a diagram showing a conventional demodulator using the diode peak detection method.

A receiver for such a scheme may simply include an amplifier, a narrowband filter, and a diode peak detector. FIG. 1 shows a conventional demodulator 100 that uses the diode peak detection method. The input signal, which may be a band-pass filtered RF signal or a mixer output intermediate frequency (IF), and as exemplified by the input waveform shown, may be provided to diode detector 102. Diode detector 102 can generate a half-wave rectified version of the input signal at node 112 (see, e.g., waveform 112), an input to buffer 110. Node 112 can also connect to low pass filter 104, which may have a cutoff frequency on the order of a half or quarter of the frequency of the input. Buffer 110 can provide an input to low pass filter 108, which may have a cutoff frequency on the order of several bit times of the ASK modulation. Filter outputs from 104 and 108 can be compared in comparator 106 to yield an output bit stream (e.g., a full stream of '1' values for a '1' data portion, and a full stream of '0' values for a '0' data portion) corresponding to the ASK modulation of the input.

Integrating such a receiver into a modern digital CMOS VLSI chip can require analog components, which may either be external to the chip or occupy a relatively large area of the chip. Therefore, modern designs may utilize more complex receiver methods to permit integration onto a single chip. However, a diode peak demodulator may still require relatively large analog components, since the peak is typically detected over many cycles of the carrier wave in this approach. Thus, a demodulation approach for ASK AM modulation using primarily digital logic that can occupy a relatively small chip area would be advantageous. Further, such a digital approach would be particularly advantageous when implemented without a multi-bit analog to digital converter (ADC) for the demodulator.

SUMMARY OF THE INVENTION

Embodiments of the present invention relate to methods, algorithms, circuits, and/or systems for amplitude shift keying (ASK) in amplitude modulation (AM) receivers.

In one embodiment, a sampling demodulator can include a comparator configured to compare an ASK modulated input to a predetermined voltage level and provide a comparison result, a pulse stretcher with a sampler configured to sample the comparison result a plurality of times for each of a plurality of cycles of the ASK modulated input to generate a bit stream and digital logic configured to determine a value for each data bit in the ASK modulated input from the bit stream, and a digital filter configured to filter an output of the digital logic, thereby providing a demodulated signal.

In another embodiment, a method of demodulating an ASK modulated input can include the steps of comparing a received ASK modulated input against a predetermined voltage level to provide a comparison result, sampling the comparison result a plurality of times per cycle of the ASK modulated input, determining a value for each data bit in the ASK modulated input from the bit stream, and filtering each value to generate a demodulated signal.

In another embodiment, a radio receiver may be configured to provide a demodulated signal from an ASK modulated input, where the radio receiver includes a mixer configured to receive the ASK modulated input and an oscillating signal, and to provide an output to a passive filter, a frequency divider configured to provide a sampling clock from the oscillating signal, and the present sampling demodulator configured to receive an output from the passive filter and the sampling clock, and to provide the demodulated signal.

Embodiments of the present invention can advantageously provide a reliable and simplified ASK demodulation approach that utilizes digital components for relatively efficient integration into a CMOS logic chip, as well as power and chip area usage. Further, embodiments of the present invention can sample an ASK modulated signal into a binary bit stream using a single comparator with a regulated voltage, where the bit stream may be processed by digital logic to provide a demodulated signal. These and other advantages of the present invention will become readily apparent from the detailed description of preferred embodiments below.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on code, data bits, data streams or waveforms within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "wiring," "line," "signal," "conductor" and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "clock," "time," "timing," "rate," "period" and "frequency" are, in general, interchangeable and may be used interchangeably herein, but are generally given their art-recognized meanings. Also, for convenience and simplicity, the terms "data," "data stream," "waveform" and "information" may be used interchangeably, as may (a) the terms "flip-flop," "latch" and "register," and (b) the terms "connected to," "coupled with," "coupled to," and "in communication with," (which may refer to direct or indirect connections, couplings, or communications) but these terms are generally given their art-recognized meanings herein.

The invention relates to hardware implementations of the present structure, method and circuit. Embodiments of the present invention can advantageously provide a reliable and simplified ASK demodulation approach that utilizes digital components for relatively efficient integration, power and chip area usage. Further, embodiments of the present invention can sample an ASK modulated signal into a binary bit stream using a single comparator with a fixed comparison or other regulated voltage, where the bit stream may be processed by digital logic to provide a demodulated signal. The invention, in its various aspects, will be explained in greater detail below with regard to exemplary embodiments.

According to various embodiments of the present invention, a circuit for demodulation can include primarily digital logic: a comparator, a fixed voltage generator (for the comparator), a pulse stretcher, and a digital filter. A target application for the particular example circuitry shown herein is an amplitude modulated (AM) radio receiver, where amplitude shift keying (ASK) is used to send AM data (e.g., binary "1" and "0" values) as an RF sine wave. In one embodiment, this RF waveform can be compared to a fixed voltage level and sampled to generate a binary bit stream. The pulse stretcher can perform digital logic operations on the binary bit stream to determine whether the bit stream is characteristic of an AM "1" or an AM "0", and produce an unfiltered, demodulated signal. The digital filter can remove pulse stretcher outputs that may be corrupted (e.g., by noise or a low comparison voltage). Of course, other types of circuits and/or digital logic blocks can also be utilized in specific embodiments.

An Exemplary Radio Receiver

An exemplary radio receiver includes: (i) a mixer configured to receive an ASK modulated input and an oscillating signal, and to provide an output to a passive filter; (ii) a frequency multiplier and/or divider configured to provide a sampling clock from the oscillating signal; and (iii) a sampling demodulator that can include a comparator configured to compare an output from the passive filter to a reference signal and provide a comparison result, a sampler configured to sample the comparison result a plurality of times for each of a plurality of cycles of the ASK modulated input to generate a bit stream, and logic configured to determine a value for each data bit in the ASK modulated input from the bit stream, thereby providing a demodulated signal.

Figure 2:
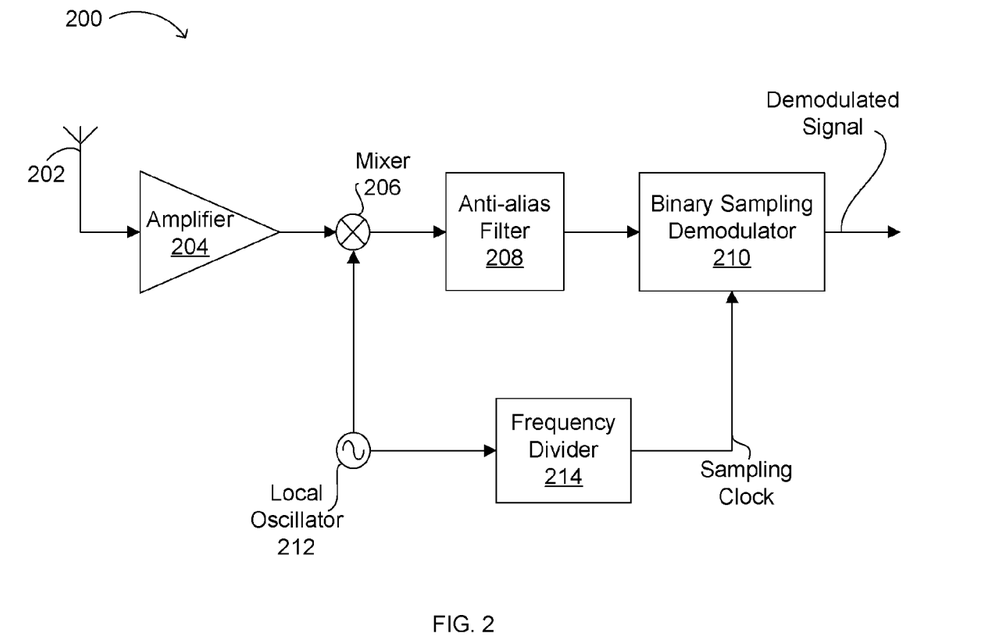
FIG. 2 is a block schematic diagram showing an exemplary single conversion heterodyne radio receiver suitable for use in accordance with embodiments of the present invention.

FIG. 2 shows an exemplary single conversion heterodyne radio receiver 200 suitable for use in accordance with embodiments of the present invention. An input signal can be received via antenna 202, and amplified using amplifier 204. Local oscillator 212 can generate an intermediate frequency (IF), which can be frequency divided via divider 214 (and/or a multiplier in some embodiments) to provide a sampling clock, and mixed via 206 with the amplified received signal. Anti-alias filter 208 (e.g., a filter used to restrict bandwidth to disallow or minimize undesirable frequency components shifting or "aliasing" into the frequency band of interest) can be a passive filter, which may not substantially change a quiescent voltage level of mixer 206 or output thereof. Thus, the quiescent or "DC no signal" of the input to binary sampling demodulator 210 can be the quiescent voltage of mixer 206 or output thereof. The sampling clock, a frequency divided version of a signal from local oscillator 212, can be utilized for demodulator 210. Thus, the sampling rate and the input IF frequency can vary in unison such that relative frequency drift between the sampling clock and the input signal can largely be ignored. Further, local oscillator 212 can be generated on-chip or board (e.g., a phase-locked loop (PLL), delay-locked loop (DLL), or other clock generator), but suitable externally provided oscillating signals may also be used in some embodiments.

Figure 3:
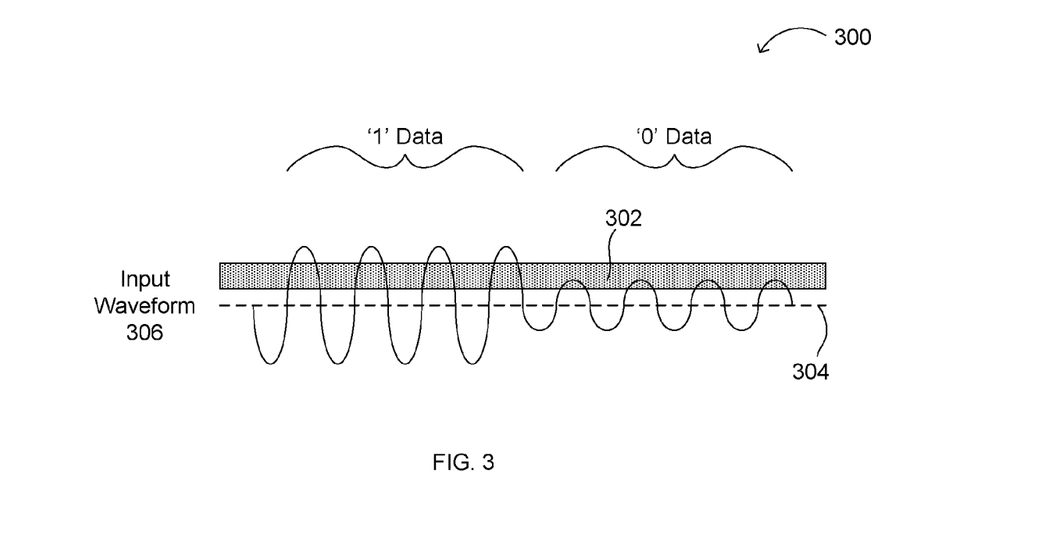
FIG. 3 is a waveform diagram showing an exemplary amplitude shift keying (ASK) modulated waveform and comparison window superimposed thereon.

FIG. 3 shows an exemplary ASK-modulated waveform and comparison window superimposed on the waveform (see general reference 300). In this example, a '10' data sequence utilizing an ASK modulation of approximately 20% is shown. Here, a '1' data bit may be a full strength or maximum amplitude sine wave (having a signal strength/amplitude of "x"), while a '0' data bit may have an amplitude that is approximately 0.2×, or about 20% of the amplitude of the full strength sine wave. In FIG. 3, the quiescent or zero signal level 304 is used as a base for comparison against the input signal or input waveform 306 by way of a fixed value above quiescent level 304. Because typical semiconductor implementations suffer from variations due to process, voltage, and temperature (PVT), an absolute voltage level for comparison may be difficult to achieve. Thus, specific embodiments can allow for a variation of the comparison level within a band of voltages 302. For example, the voltage band 302 may range from a lower value of about 0.1-0.2 times (i.e., about 10-20% of) the amplitude of the full strength sine wave to an upper value of about 0.5-0.6 times (i.e., about 50-60% of) the amplitude of the full strength sine wave. Further, such comparison level variation can be controllable and/or adjustable, such as by an end user or in the fabrication, assembly, and/or test stages of manufacturing.

Figure 4A:
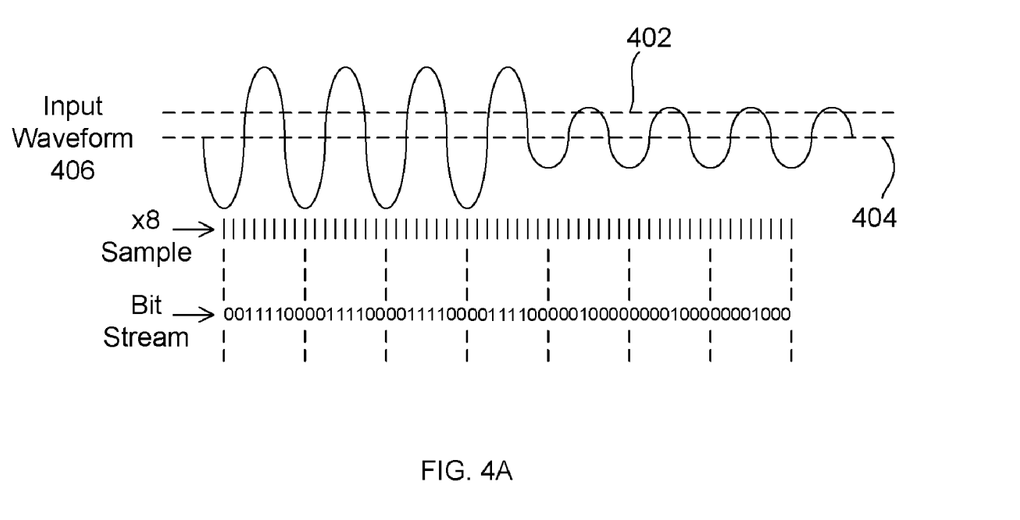
FIGS. 4A-4B illustrates waveform diagrams showing exemplary resulting bit streams in accordance with embodiments of the present invention.
Figure 4B:
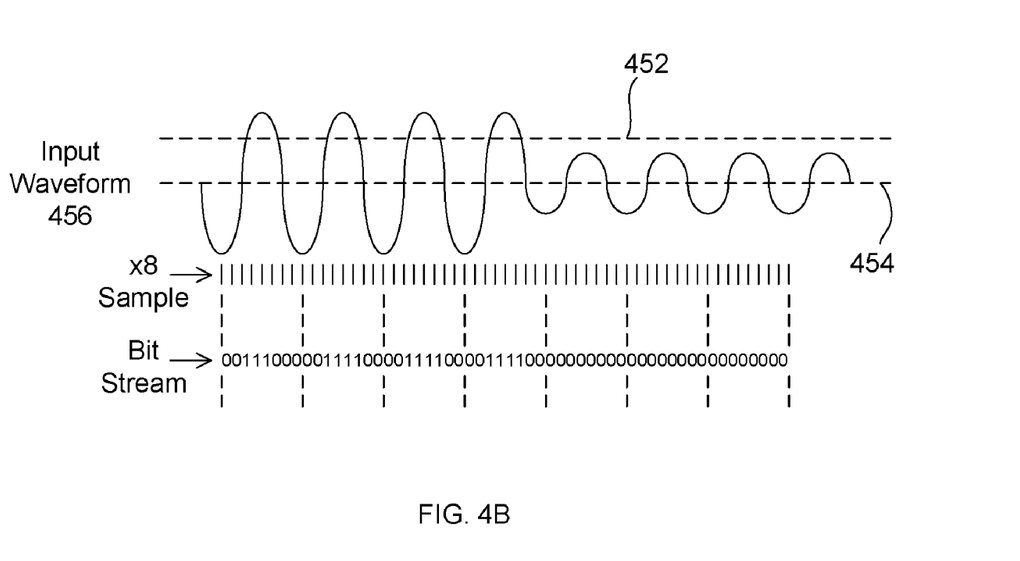

FIGS. 4A-4B shows exemplary resulting bit streams in accordance with embodiments of the present invention. In FIG. 4A, input waveform 406 is shown oscillating around quiescent level 404, and comparison level 402 is relatively low. A resulting example bit stream from an eight times sampling rate shows that some of the values in the '0' data bit area appear as binary '1' bits. In FIG. 4B, input waveform 456 is shown oscillating around quiescent level 454, but with a relatively high comparison level 452. In this case, the bit stream for the '0' data bit area contains no '1' bits, but there remains some '0' bits within the '1' data bit area. To resolve both bit streams correctly, digital processing can be utilized to correct occasional bit errors, as well as to provide more predictable data sequences.

An Exemplary Sampling Demodulator

An exemplary sampling demodulator can include: (i) a comparator configured to compare an ASK modulated input to a predetermined voltage level and provide a comparison result; (ii) a pulse stretcher with (a) a sampler configured to sample the comparison result a plurality of times for each of a plurality of cycles of the ASK modulated input to generate a bit stream, and (b) digital logic configured to determine a value for each data bit in the ASK modulated input from the bit stream; and (iii) a digital filter configured to filter an output of the digital logic, thereby providing a demodulated signal.

Figure 5:
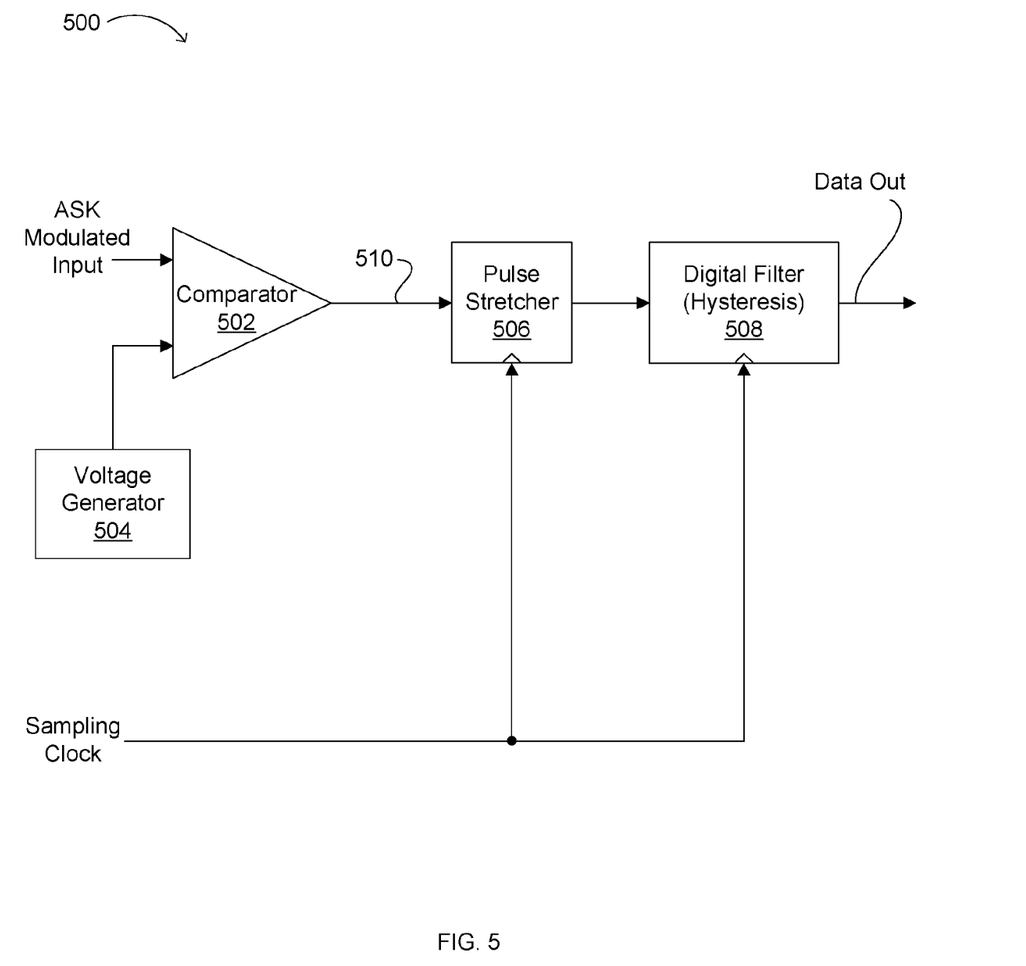
FIG. 5 is a block schematic diagram showing an exemplary demodulator in accordance with embodiments of the present invention.

FIG. 5 shows an exemplary demodulator 500 in accordance with embodiments of the present invention. Comparator 502 can receive an ASK modulated input signal, as well as an output from voltage generator 504. For example, voltage generator 504 may be a fixed comparison voltage generator, or any other suitable reference signal and/or voltage, that can provide an adjustable output level. In one approach, a duplicate of a mixer in comparator 502 can be utilized in the implementation of voltage generator 504 by essentially adding an offset voltage to the duplicate mixer with no input signal applied, as in a "replica biasing" approach. Such a fixed offset voltage may be determined by any number of factors. For example, if the maximum input signal is 250 mV above the quiescent level, and the modulation is 20%, a 125 mV offset can place the comparison level in the range shown in FIG. 4B. In this fashion, a replica mixer plus fixed offset may be used to determine a regulated voltage having substantial PVT variation immunity.

In FIG. 5, resulting comparison 510 can be provided to pulse stretcher 506, which first samples comparator output 510 with the sampling clock, and then processes the resulting bit stream. Such a pulse stretcher may be used to overcome changes to the comparison voltage level by effectively "stretching" true data bit detections to replace adjacent false detections. Generally, pulse stretcher 506 may convert a mixed stream of '1' and '0' bits of a sampled '1' (or '0') data bit, and output a stream of only '1' (or '0') bits (see, e.g., FIGS. 6A and 6B, discussed below). Also, because the ASK modulated input signal may be corrupted with noise, the resulting bit stream output from pulse stretcher 506 may contain occasional '0' bits in the '1' data bit area, and '1' bits in the '0' data bit area. To filter out such noise-based corruptions, digital filter 508 can be utilized to produce demodulated data out (see, e.g., FIGS. 7A and 7B, discussed below). For example, digital filter 508 can employ a combination of low pass filtering and hysteresis.

Figure 6A:
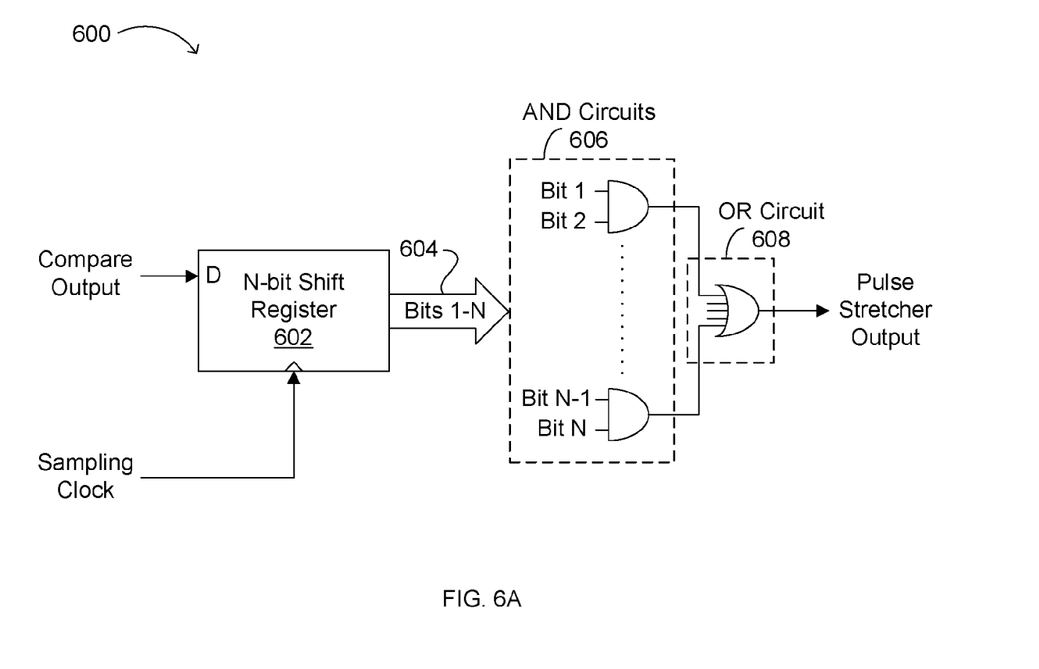
FIG. 6A is a block schematic diagram showing an exemplary pulse stretcher in accordance with embodiments of the present invention.

FIG. 6A shows an exemplary pulse stretcher 600 in accordance with embodiments of the present invention. The compare output may be coupled to a first input (e.g., of a first flip-flip) of an N-stage synchronous shift register 602, which can be clocked by the sampling clock to implement a sampling function. Such a shift register can include a plurality of flip-flops connected in series. For example, N may be equal to one plus the ratio of the sampling clock to the IF frequency, such as the divider ratio of frequency divider 214 of FIG. 2. Here, N-bit shift register 602 can effectively sample the comparator output, and delay the resulting binary samples by N+1 clock times. In this particular example, two or more consecutive '1' samples can be stretched to a full N-bit wide stream of '1' bits.

Figure 6B:
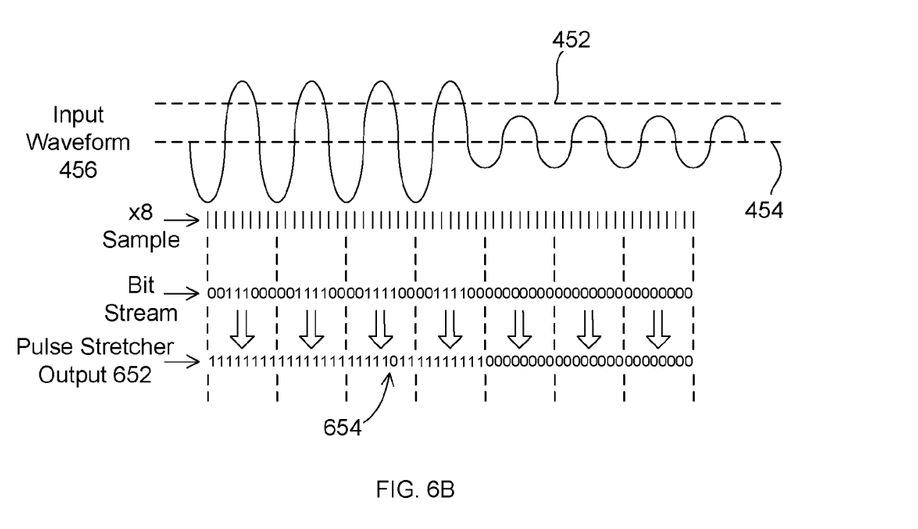
FIG. 6B illustrates waveform diagrams showing exemplary pulse stretcher output values in accordance with embodiments of the present invention.

For pulse stretching in specific embodiments, an array of logical AND circuits 606 can perform an AND function on each two adjacent bits of shift register output 604 bits 1-N. Resulting outputs from AND circuits 606 may then undergo a logical-OR function via OR circuit 608 to provide a pulse stretched output. Because two adjacent '1' bits are required for a '1' output from a 2-input AND gate, occasional single '1' bits due to a low compare level or noise may be eliminated in the output string. For example, FIG. 6B shows pulse stretcher output 652 based on the example input waveform discussed above with reference to FIG. 4B. Further, for different sampling rates to IF frequency ratios, or different threshold ranges, such AND gates in AND circuits 606 may be extended to 3-input, 4-input, or more adjacent bit logic functions. Of course, levels of AND gate logic, or other dynamically precharged logic, can be utilized to accommodate the larger adjacent bit combinations (e.g., ≧4 adjacent bits per AND or NAND gate structure). In various embodiments, N can be at least 4, at least 8, or any other sampling rate selected in accordance with design choices and/or preferences.

Figure 7A:
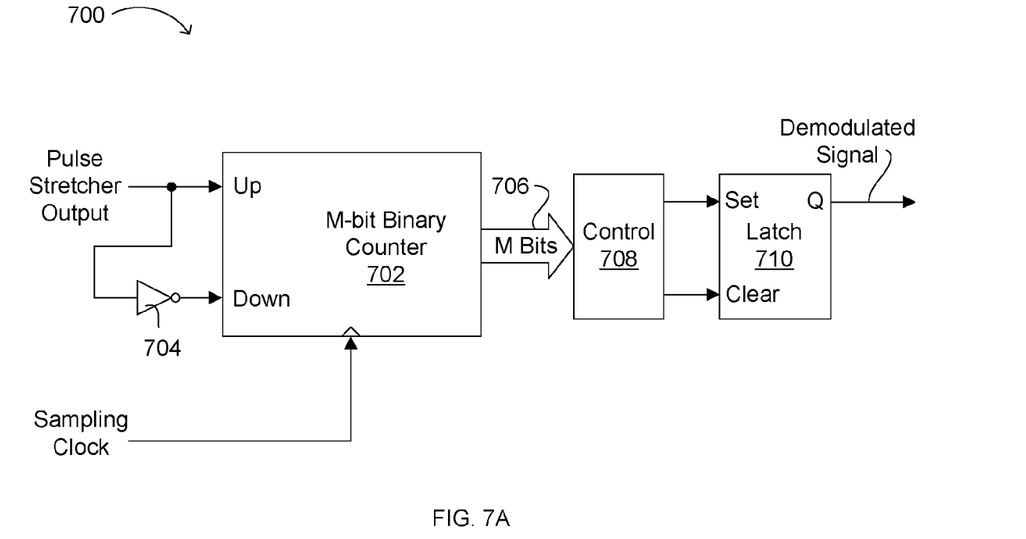
FIG. 7A is a block schematic diagram showing an exemplary binary filter and detector with hysteresis in accordance with embodiments of the present invention.
Figure 7B:
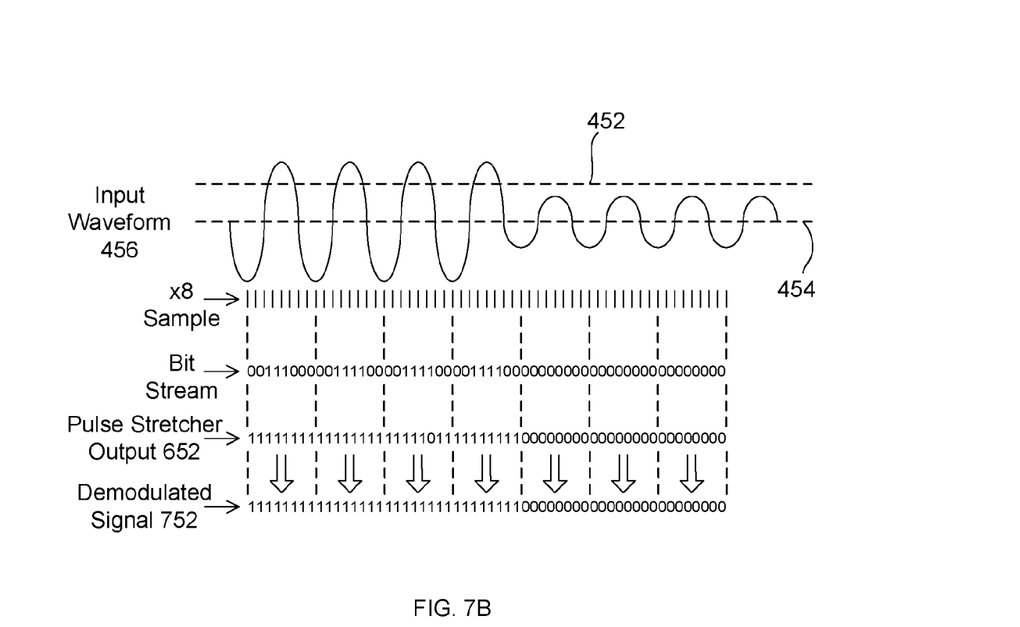
FIG. 7B illustrates waveform diagrams showing exemplary demodulated signal values in accordance with embodiments of the present invention.

Noise in the input could cause incorrect '1' or '0' samples (see, e.g., 654 in FIG. 6B), which can propagate to the output of the pulse stretcher, or may be stretched to full N-bit incorrect samples. In order to filter such noise bursts from the input and improve noise immunity, a binary low pass filter with hysteresis may be utilized. FIG. 7A shows an exemplary binary filter/detector with hysteresis 700 in accordance with embodiments of the present invention. The pulse stretcher output maybe coupled to the control inputs (e.g., directly to the "up" input, and via inverter 704 to the "down" input) of an M-bit binary counter 702. For example, counter 702 may be a saturating up/down synchronous counter clocked by the same sampling clock used to clock the pulse stretcher for improved synchronization, although a common clock signal is not necessary for both the counter and the pulse stretcher, and any other suitable clock signal(s) or timing scheme may be utilized.

The pulse stretcher output can generally control whether the binary counter counts up or down. If the pulse stretcher output is a '1' level, the counter can increment, while the counter can decrement if the pulse stretcher output is a '0' level. Counter 702 can provide M-bit output 706 to control block 708, which can control set/reset functionality of latch 710 for providing the demodulated signal (see, e.g., demodulated signal 752 in FIG. 7B). Latch 710 may be set when the counter reaches a given value (e.g., value A), and reset when the counter reaches another value (e.g., value B) less than first value (B<A). Thus, any hysteresis of B-A can occur at a minimum of counter 702. Further, the number of bits in the counter (e.g., M) may be determined by the desired cut off frequency value of the low pass filter, where the cut off frequency may be approximately equal to the sample frequency divided by $2^M$. In this fashion, a binary saturating counter with a latch output may be utilized as a low pass filter with hysteresis, suitable to produce a demodulated signal from a pulse stretcher output.

An Exemplary Method of ASK Demodulation

An exemplary method of demodulating an ASK modulated input can include the steps of: (i) comparing a received ASK modulated input against a predetermined voltage level to provide a comparison result; (ii) sampling the comparison result a plurality of times per cycle of the ASK modulated input; (iii) determining a value for each data bit in the ASK modulated input from the bit stream; and (iv) filtering each value to generate a demodulated signal.

Figure 8:
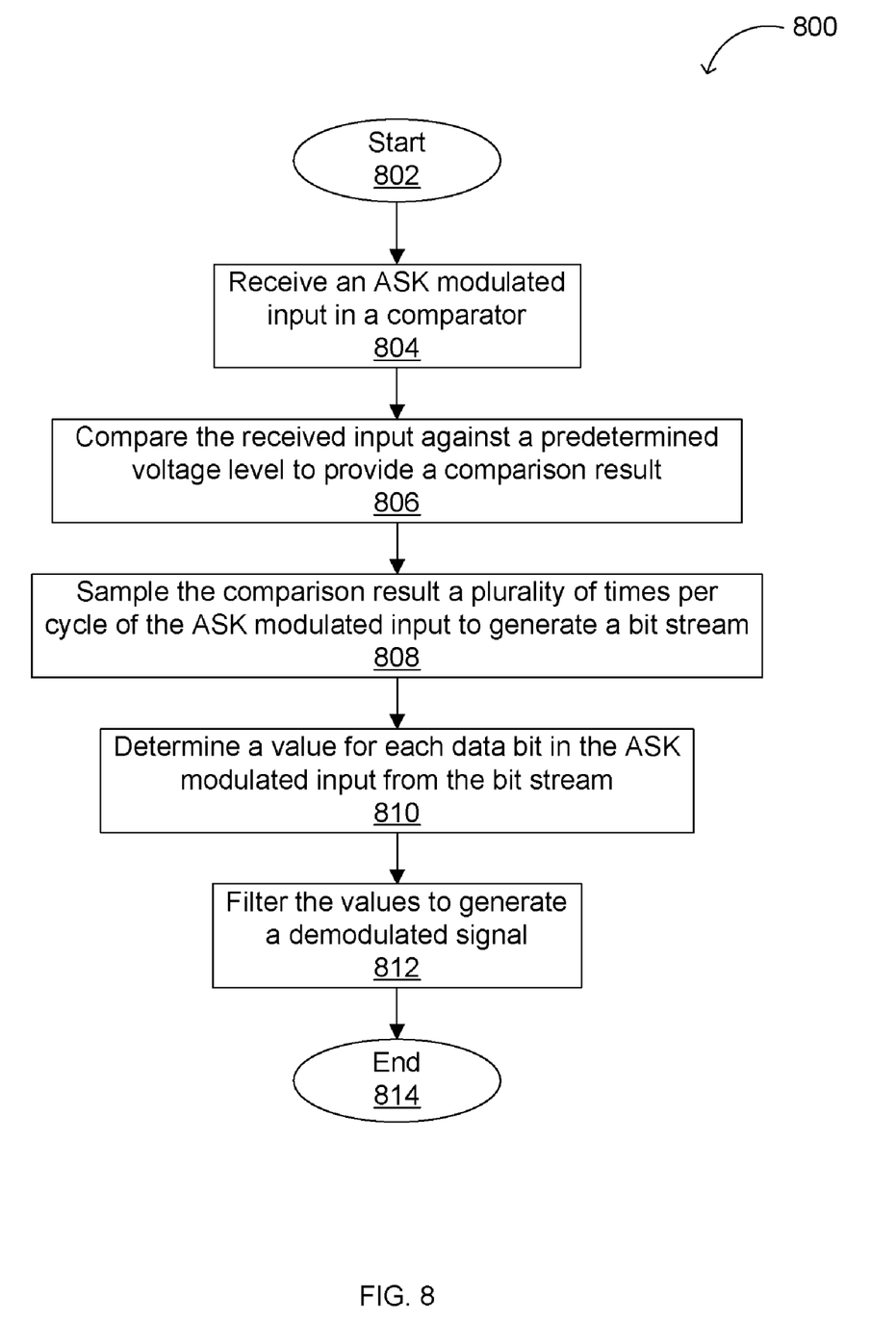
FIG. 8 is a flow diagram showing an exemplary method of ASK demodulation in accordance with embodiments of the present invention.

FIG. 8 is a flow diagram showing an exemplary method of ASK demodulation 800 in accordance with embodiments of the present invention. The flow can begin (802), and an ASK modulated input can be received in a comparator (804). The received input may be compared against a reference signal predetermined voltage level (e.g., a fixed comparison voltage) to provide a comparison result (806). The comparison result can be sampled (e.g., a plurality of times per cycle of the ASK modulated input, as shown in FIG. 6B) to generate a bit stream (808). A value corresponding to each data bit in the ASK modulated input can be determined from the bit stream (810), such as by utilizing a pulse stretcher. The values can be filtered (e.g., using a digital filter including a binary counter, as shown in FIG. 7A) to generate a demodulated signal (812), such as that shown in FIG. 7B, and the flow can complete (814).

Figure 9:
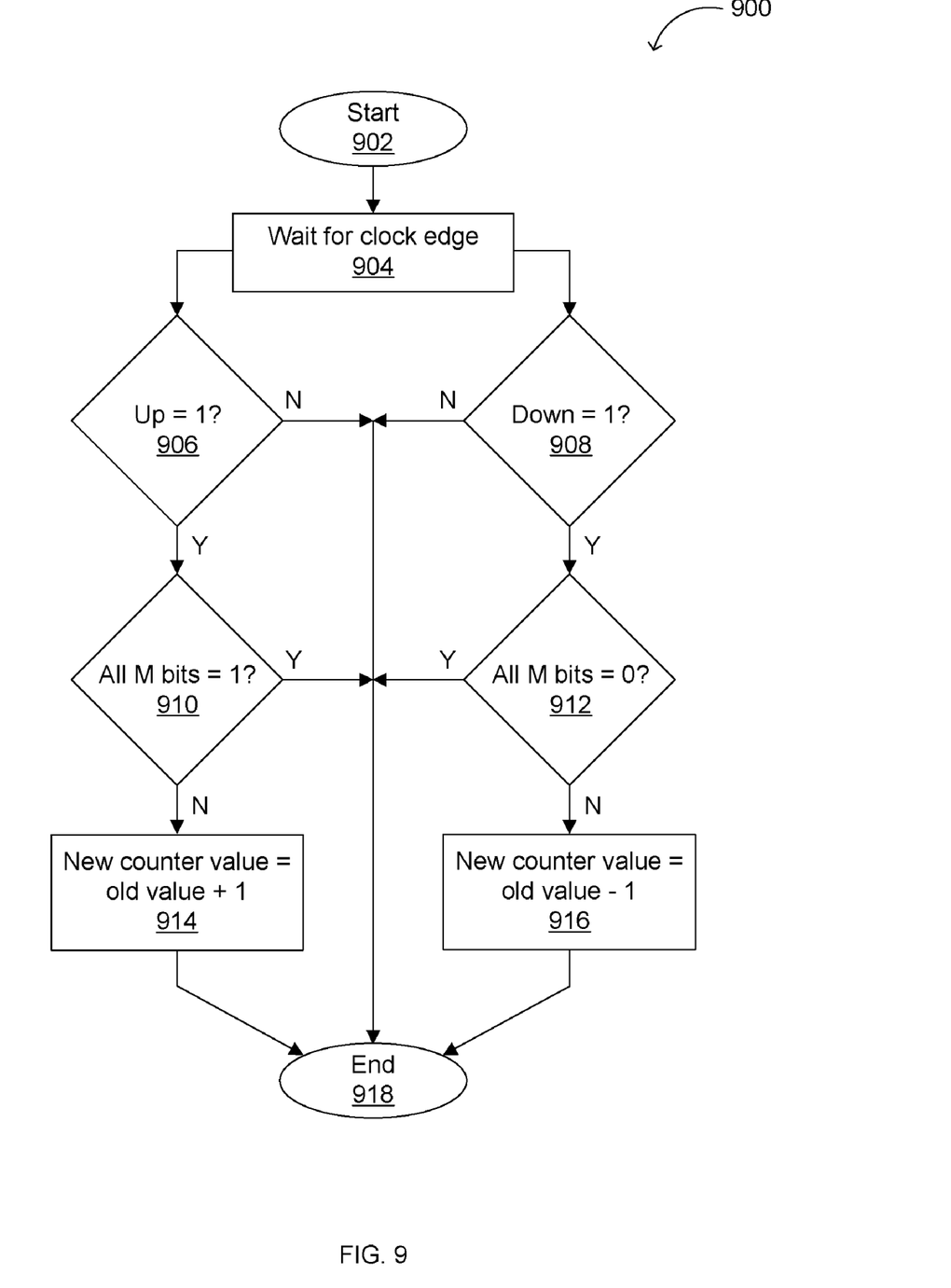
FIG. 9 is a flow diagram showing an exemplary method of counter operation in accordance with embodiments of the present invention.

FIG. 9 is a flow diagram showing an exemplary method of counter operation 900 in accordance with embodiments of the present invention. The flow can begin (902), and when a clock edge occurs (904), a determination of up/down controls can be made. If up is equal to 1 (906), but all M bits are not equal to 1 (910), the new counter value may be equal to the old counter value plus one (914), and the flow can complete (918). If down is equal to 1 (908), but all M bits are not equal to 0 (912), the new counter value may be equal to the old counter value minus one (916), and the flow can complete (918). In this fashion, a solid string of '1' values or '0' values (see, e.g., demodulated signal 752 in FIG. 7B) can be obtained from an input string having noise therein (see, e.g., corresponding pulse stretcher output 652 in FIG. 7B) by utilizing such counter outputs in the control of a latch (e.g., latch 710 discussed above with reference to FIG. 7A).

While the above examples include primarily digital implementations of ASK demodulation circuitry, one skilled in the art will recognize that other implementations and/or technologies may also be used in accordance with embodiments. Further, one skilled in the art will recognize that current-based differential signaling and/or control may also be used in accordance with embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A sampling demodulator, comprising:
   a) a comparator configured to compare an amplitude shift keying (ASK) modulated input to a predetermined voltage level and provide a comparison result;
   b) a pulse stretcher, comprising (i) a sampler configured to sample said comparison result a plurality of times for each of a plurality of cycles of said ASK modulated input to generate a bit stream, and (ii) digital logic configured to determine a value for each data bit in said ASK modulated input from said bit stream; and
   c) a digital filter configured to filter an output of said digital logic, thereby providing a demodulated signal.

2. The sampling demodulator of claim 1, wherein said sampler samples said comparison result at least four times per ASK modulated input period.

3. The sampling demodulator of claim 1, wherein said bit stream is an N-bit bit stream divided into N/2 adjacent pairs of bits, and said digital logic comprises a plurality of two-input AND circuits for performing an AND function on each adjacent pair of bits, and an OR circuit coupled to receive the output from said plurality of two-input AND circuits.

4. The sampling demodulator of claim 1, wherein said digital filter comprises a latch controllable by a binary counter.

5. The sampling demodulator of claim 4, wherein said binary counter is clocked by a sampling clock.

6. The sampling demodulator of claim 4, wherein said binary counter comprises a saturating type counter.

7. The sampling demodulator of claim 1, wherein said sampler comprises a first flip-flop configured to sample said comparison result using a sampling clock.

8. The sampling demodulator of claim 7, wherein said digital filter comprises a plurality of second flip-flops in series.

9. The sampling demodulator of claim 8, wherein said first flip-flop and said plurality of second flip-flops form a shift register.

10. The sampling demodulator of claim 1, wherein said predetermined voltage level is configured to be adjusted using a voltage generator coupled to said comparator.

11. A radio receiver configured to provide a demodulated signal from an amplitude shift keying (ASK) modulated input, said radio receiver comprising:
 a) a mixer configured to receive said ASK modulated input and an oscillating signal, and to provide an output to a passive filter;
 b) a frequency divider configured to provide a sampling clock from said oscillating signal; and
 c) a sampling demodulator to said mixer and said frequency divider, comprising a comparator configured to compare an output from said passive filter to a reference signal and provide a comparison result, a sampler configured to sample said comparison result a plurality of times for each of a plurality of cycles of said ASK modulated input to generate a bit stream, and digital logic configured to determine a value for each data bit in said ASK modulated input from said bit stream.

12. The radio receiver of claim 11, further comprising a digital filter configured to filter an output of said digital logic, thereby providing said demodulated signal.

13. The radio receiver of claim 11, wherein said sampler samples said comparison result at least four times per ASK modulated input period.

14. The radio receiver of claim 11, wherein said bit stream is an N-bit bit stream divided into N/2 adjacent pairs of bits, and said digital logic comprises a plurality of two-input AND circuits for performing an AND function on each adjacent pair of bits, and an OR circuit coupled to receive the output from said plurality of two-input AND circuits.

15. The radio receiver of claim 12, wherein said digital filter comprises a latch controllable by a binary counter.

16. The radio receiver of claim 15, wherein said binary counter is clocked by said sampling clock.

17. The radio receiver of claim 16, wherein said binary counter comprises a saturating type counter.

18. The radio receiver of claim 12, wherein said sampler comprises a first flip-flop configured to sample said comparison result using said sampling clock.

19. The radio receiver of claim 18, wherein said digital filter comprises a plurality of second flip-flops in series.

20. The radio receiver of claim 19, wherein said first flip-flop and said plurality of second flip-flops form a shift register.

21. The radio receiver of claim 11, wherein said reference signal is configured to be adjusted using a voltage generator coupled to said comparator.

22. A method of demodulating an amplitude shift keying (ASK) modulated input, comprising the steps of:
 a) comparing a received ASK modulated input against a predetermined voltage level to provide a comparison result using a comparator;
 b) sampling said comparison result a plurality of times per cycle of said ASK modulated input to generate a bit stream;
 c) determining a value for each data bit in said ASK modulated input from said bit stream; and
 d) filtering each said value to generate a demodulated signal.

23. The method of claim 22, wherein said sampling comprises entering said comparison result into a first flip-flop controlled by a sampling clock, said sampling clock oscillating said plurality of times per cycle of said ASK modulated input.

24. The method of claim 22, wherein said determining comprises logically combining each said value using a plurality of AND circuits coupled to an OR circuit.

25. The method of claim 23, wherein said filtering comprises controlling a latch with a binary counter, said latch providing said demodulated signal.

26. The method of claim 25, wherein said filtering further comprises shifting an output from said first flip-flop in a shift register formed from said first flip-flop and a plurality of second flip-flops in series.

27. The method of claim 25, wherein said binary counter increments a counter value when an up counter control is asserted and a plurality of counter output bits have a first logic value.

28. The method of claim 25, wherein said binary counter decrements a counter value when a down counter control is asserted and a plurality of counter output bits have a second logic value.

29. The method of claim 22, further comprising adjusting said predetermined voltage.

* * * * *